April 17, 1934.    J. W. DIVINA    1,955,228
INSECTICIDE SPRAYING DEVICE
Filed July 10, 1933    2 Sheets-Sheet 2
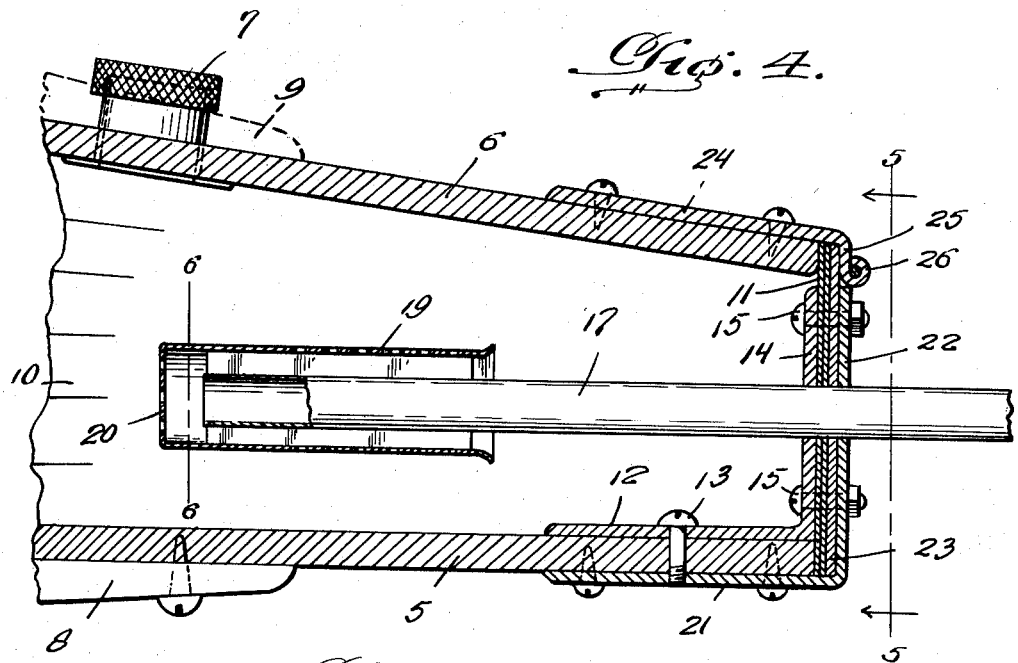
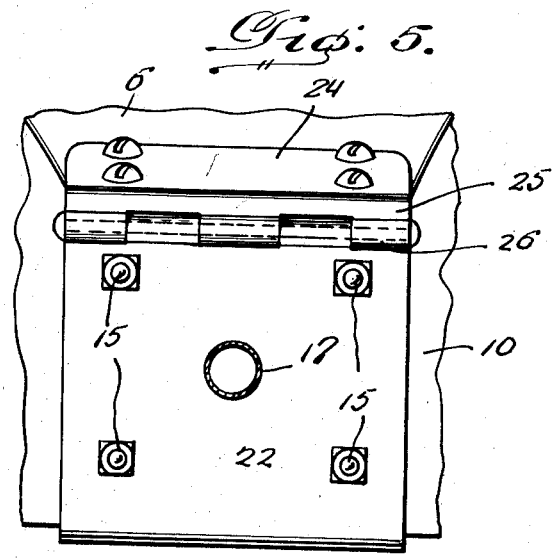
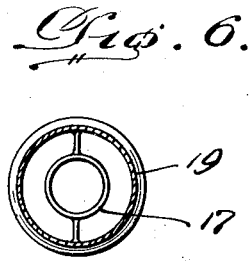
John W. Divina,
INVENTOR.
BY J. Stanley Burch
ATTORNEY.

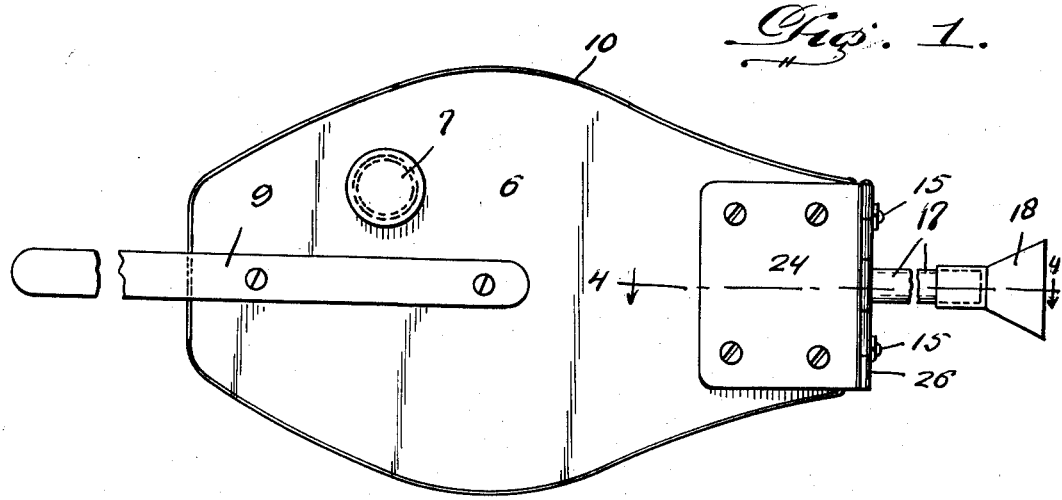
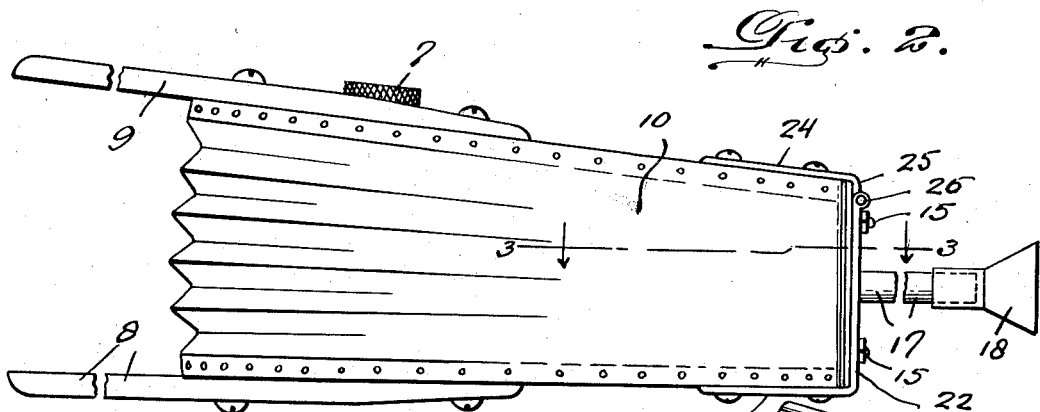
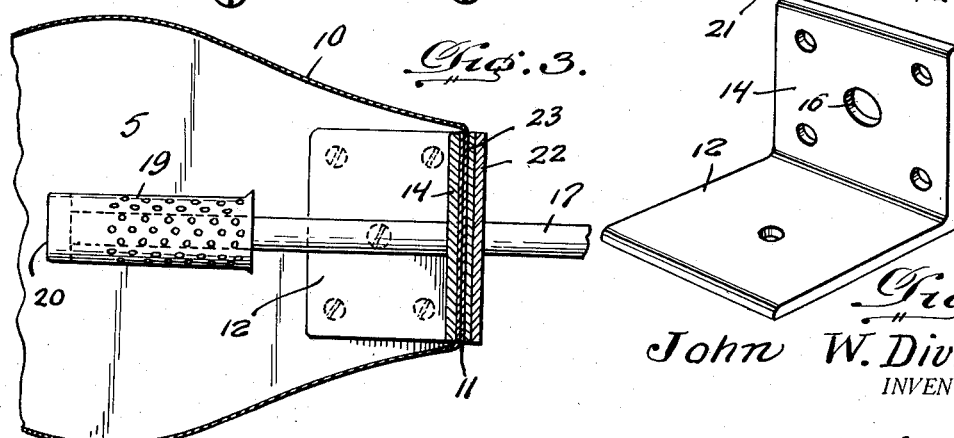

Patented Apr. 17, 1934

1,955,228

UNITED STATES PATENT OFFICE 1,955,228

INSECTICIDE SPRAYING DEVICE

John W. Divina, Weston, Mo.

Application July 10, 1933, Serial No. 679,775

3 Claims. (Cl. 43—147)

This invention relates to improvements in devices of the bellows type for spraying or distributing powdered insecticides.

An important object of the present invention is to provide a bellows construction in which the portion of the flexible wall of the bellows at the smaller discharge end of the latter is rigidly clamped and braced to one of the rigid side walls of the bellows, and wherein a metallic hinge connection is provided between the other rigid side wall of the bellows and such portion of the flexible wall, whereby the latter is relieved of strain and wear such as causes premature leakage of bellows of ordinary construction and soon renders them unfit for further use.

A further important object of the invention is to provide a device of the above character in which simple and efficient means is provided to insure even flow of the insecticide from the bellows without danger of clogging or waste of the insecticide, and whereby the air drawn into the bellows is distributed throughout the latter and caused to create rapid agitation of the insectide therein for preventing such clogging and insuring such even flow.

A further object of the invention is to provide a device of the above kind which may be readily and cheaply manufactured, which will be extremely durable and efficient in use, and which is a general improvement in the art.

The invention consists in the novel form, combination and arrangement of parts hereinafter more fully described, shown in the accompanying drawings and claimed.

In the drawings:

Figure 1 is a plan view of an insecticide spraying device embodying the present invention.

Figure 2 is an edge elevational view thereof.

Figure 3 is a fragmentary longitudinal section on line 3—3 of Figure 2.

Figure 4 is an enlarged fragmentary longitudinal section taken substantially upon line 4—4 of Figure 1.

Figure 5 is a transverse section on line 5—5 of Figure 4.

Figure 6 is a transverse section on line 6—6 of Figure 4; and

Figure 7 is a perspective view of the angular brace for rigidly connecting a rigid side wall of the bellows with the portion of the flexible wall thereof at the smaller discharge end of the bellows.

Referring in detail to the drawings, the bellows includes rigid side walls 5 and 6, one of which is provided with an opening having a closure 7 and through which the powdered insecticide may be introduced to the interior of the bellows. These rigid walls are provided with the usual operating handles 8 and 9 and are provided about their edges with a wall 10 of tough flexible material, such as leather. The strip from which this wall 10 is formed is overlapped at the smaller ends of the rigid walls 5 and 6 so as to produce a double thickness, and at the center of the end wall portion 11 thus produced, alined openings are formed through the overlapped ends of the strip. Arranged inside the bellows is an angular brace having one arm or flange 12 rigidly secured at 13 to the inner face of the rigid wall 5 at the smaller end of the latter, and having its other arm or flange 14 rigidly secured at 15 against the inner face of the wall portion 11. In this way the end wall portion 11 of the flexible wall 10 is rigidly braced to the rigid side wall 5 of the bellows.

The arm or flange 14 of the angular brace has a central opening 16 alined with the openings in the overlapped ends of wall 10 and in which is rigidly and permanently secured the intermediate portion of a discharge conduit 17, the outer end of which projects beyond the outer face of the wall 11 and terminates in a spreader nozzle 18, and the inner end of which is open and terminates within the bellows intermediate its ends. Secured over the inner end of the discharge conduit 17 in spaced concentric relation to the latter is a perforated tube 19 open at its outer end and partially closed at its inner end by a perforated end wall 20 spaced a short distance inwardly from the open inner end of discharge conduit 17. The perforated tube 19 with its perforated inner end wall 20 mounted with relation to the inner end portion of discharge conduit 17 as shown and described, constitutes a device by which air drawn into the bellows is distributed throughout all parts of the latter so as to cause thorough and rapid agitation of the powdered insecticide within said bellows so as to insure a subsequent even flow of the insecticide from the bellows and an even distribution of the insecticide on the plants or objects being sprayed, without danger of clogging, when the device is operated. This action is most efficiently obtained by reason of the numerous perforations in the tube 19 and its end wall 20, and the relation of the latter with the outlet or inner end of the discharge conduit 17.

A metallic hinge connection is provided between the other rigid wall 6 of the bellows and the adjacent edge portion of the portion 11 of the flexible wall 10. This hinge connection includes an angular hinge leaf, one arm or flange 21 of which is rigidly secured at 13 to the outer face of the rigid side wall 5 at the smaller end of the latter and in opposed relation to the arm 12 of the internal brace. The other arm or flange 22 of this angular hinge leaf is rigidly secured at 15 against the outer face of the wall portion 11 so that the latter is flatly and rigidly clamped between the arm or flange 14 of the internal brace and the arm 22 of the angular hinge leaf, and so that the wall portion 11 is rigidly connected to the rigid side wall 5. This provides a strong and durable construction at the discharge end of the bellows capable of withstanding considerable strain. The arm or flange 22 of the angular hinge leaf has a central opening registered with the openings in the brace arm 14 and wall portion 11 to permit the outward passage of discharge conduit 17 therethrough, and clamped between the arm 22 of the angular hinge leaf and the outer face of the wall portion 11 is a leather washer 23 of an area equal to and completely covering the outer face of the wall portion 11. In this way the wall portion 11 is strengthened and reinforced, and the washer 23 has an opening for permitting passage of discharge conduit 17 therethrough, similar to the brace and hinged leaf arms 14 and 22. Attached to the outer face of the other rigid side wall 6 of the bellows at the smaller end of the latter is a further hinged leaf 24 having a short inwardly directed outer end portion 25 pivotally connected at 26 to the adjacent free end of arm 22 of the angular hinged leaf. In this way the rigid side wall is pivotally connected to the adjacent edge of the wall portion 11 for free swinging movement relative to the major portion of the latter and the opposite rigid side wall 5. This rigid hinged construction prevents swinging of the rigid side wall 6 except on a definite pivotal axis and provides means for effectively relieving the wall portion 11 of strain and wear as the edge portion of said wall portion 11 adjacent rigid wall 6 is flexed in the operation of the bellows. In addition, this flexible portion of the wall portion 11 is reinforced by the adjacent part of leather washer 23, and the result is that the bellows may be used for a long continued time without danger of the wall portion 11 breaking and causing leakage of the bellows so that the latter is rendered unfit for further use. Practice has demonstrated that by clamping and holding the overlapped ends of the wall 10 together in this way between the opposed arms of the angular brace and hinged leaf, and by providing a metal hinged connection between the wall portion 11 and the movable rigid side wall 6, the strain in operating the bellows is placed entirely on the metal hinge instead of on the material of the bellows wall 10. At the same time, a most effective rigid connection is provided between the wall portion 11 and the adjacent end of the other rigid side wall 5. A bellows construction is thus had which possesses the desired flexibility, but which is at the same time extremely durable and capable of withstanding a long period of continuous use.

From the foregoing description, it is believed that the construction, operation and advantages of the present invention will be readily understood and appreciated by those skilled in the art. Minor changes are contemplated within the spirit and scope of the invention as claimed.

What I claim as new is:

1. In an insecticide spraying device, a bellows structure comprising opposed rigid side walls, a strip of tough flexible material connecting said walls, the ends of said strip being overlapped at one end of the rigid walls, an angular brace having one flange secured to the inner face of one of said rigid walls and having its other flange opposing and rigidly secured to the inner face of said overlapped portions to rigidly connect them to the rigid wall to which the first-named flange is secured, the free end of the second-named flange extending adjacent the other of said rigid walls, and a metal hinge connection between said overlapped portions and the other rigid wall including an angular hinge leaf having one flange secured against the outer face of the first-named rigid wall in opposed relation to the first-named flange of said brace, the other flange of said angular hinge leaf being rigidly secured to the outer face of said overlapped portions in opposed relation to the second-named flange of said angular brace whereby said overlapped portions are rigidly clamped between the second-named flange of the brace and the angular hinge leaf and rigidly connected to the first-named rigid wall of the bellows, said second-named flange of the angular hinge leaf extending adjacent said other of the rigid walls, and a second hinge leaf pivotally connected to the first-named hinge leaf and rigidly attached to the outer face of said other of the rigid walls.

2. In an insecticide spraying device, a bellows structure comprising opposed rigid side walls, a strip of tough flexible material connecting said walls, the ends of said strip being overlapped at one end of the rigid walls, an angular brace having one flange secured to the inner face of one of said rigid walls and having its other flange opposing and rigidly secured to the inner face of said over-lapped portions to rigidly connect them to the rigid wall to which the first-named flange is secured, the free end of the second-named flange extending adjacent the other of said rigid walls, and a metal hinge connection between said overlapped portions and the other rigid wall including an angular hinge leaf having one flange secured against the outer face of the first-named rigid wall in opposed relation to the first-named flange of said brace, the other flange of said angular hinge leaf being rigidly secured to the outer face of said overlapped portions in opposed relation to the second-named flange of said angular brace whereby said overlapped portions are rigidly clamped between the second-named flange of the brace and the angular hinge leaf and rigidly connected to the first-named rigid wall of the bellows, said second-named flange of the angular hinge leaf extending adjacent said other of the rigid walls, a second hinge leaf pivotally connected to the first-named hinge leaf and rigidly attached to the outer face of said other of the rigid walls, and a leather washer clamped between the outer face of said overlapped portion and the second-named flange of the angular hinge leaf, said washer being of an area equal to the area of the outer face of said overlapped portions to overlie and reinforce the flexible part of said overlapped portions lying adjacent said other of the rigid walls.

3. In an insecticide spraying device, a bellows structure comprising opposed rigid side walls, a strip of tough flexible material connecting said walls, the ends of said strip being overlapped at one end of the rigid walls, an angular brace having one flange secured to the inner face of one of said rigid walls and having its other flange opposing and rigidly secured to the inner face of said overlapped portions to rigidly connect them to the rigid wall to which the first-named flange is secured, the free end of the second-named flange extending adjacent the other of said rigid walls, and a metal hinge connection between said overlapped portions and the other rigid wall including an angular hinge leaf having one flange secured against the outer face of the first-named rigid wall in opposed relation to the first-named flange of said brace, the other flange of said angular hinge leaf being rigidly secured to the outer face of said overlapped portions in opposed relation to the second-named flange of said angular brace whereby said overlapped portions are rigidly clamped between the second-named flange of the brace and the angular hinge leaf and rigidly connected to the first-named rigid wall of the bellows, said second-named flange of the angular hinge leaf extending adjacent said other of the rigid walls, and a second hinge leaf pivotally connected to the first-named hinge leaf and rigidly attached to the outer face of said other of the rigid walls, said overlapped portions and the second-named flange of the angular brace and the angular hinge leaf having alined openings, and a discharge conduit extending through said alined openings and permanently secured in the opening of the second-named flange of the angular brace.

JOHN W. DIVINA.